Figure 3:
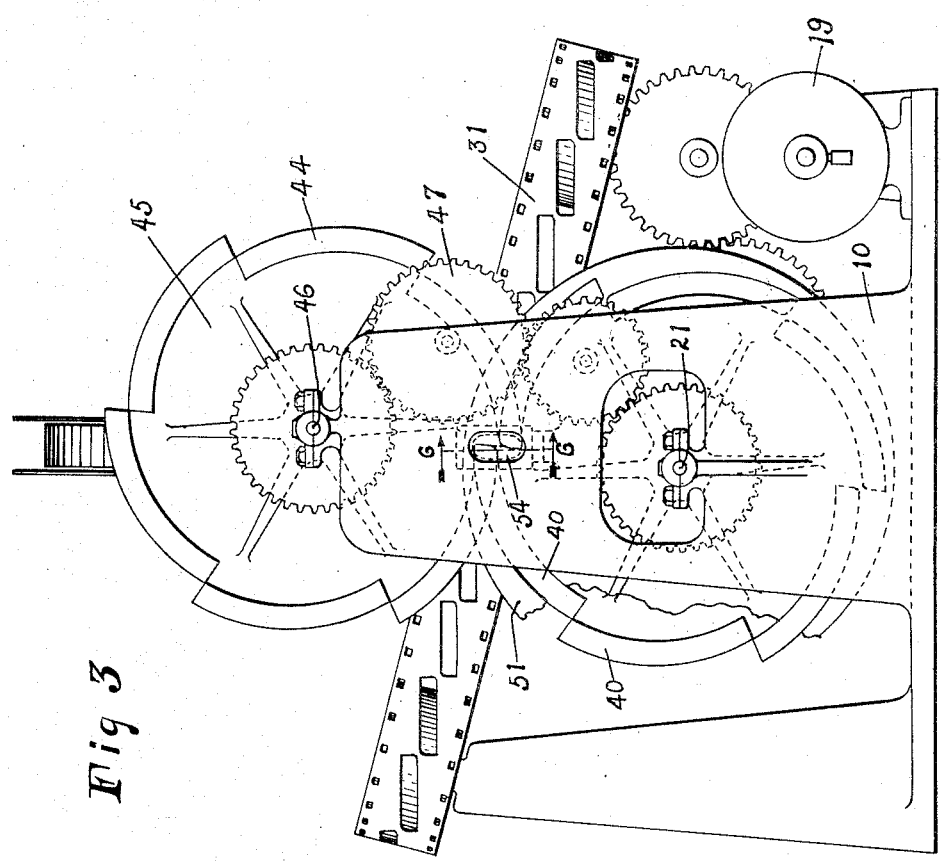

June 9, 1925.  
E. C. ROGERS  
1,540,902  
MOVING PICTURE MACHINE  
Filed May 14, 1920  3 Sheets-Sheet 1
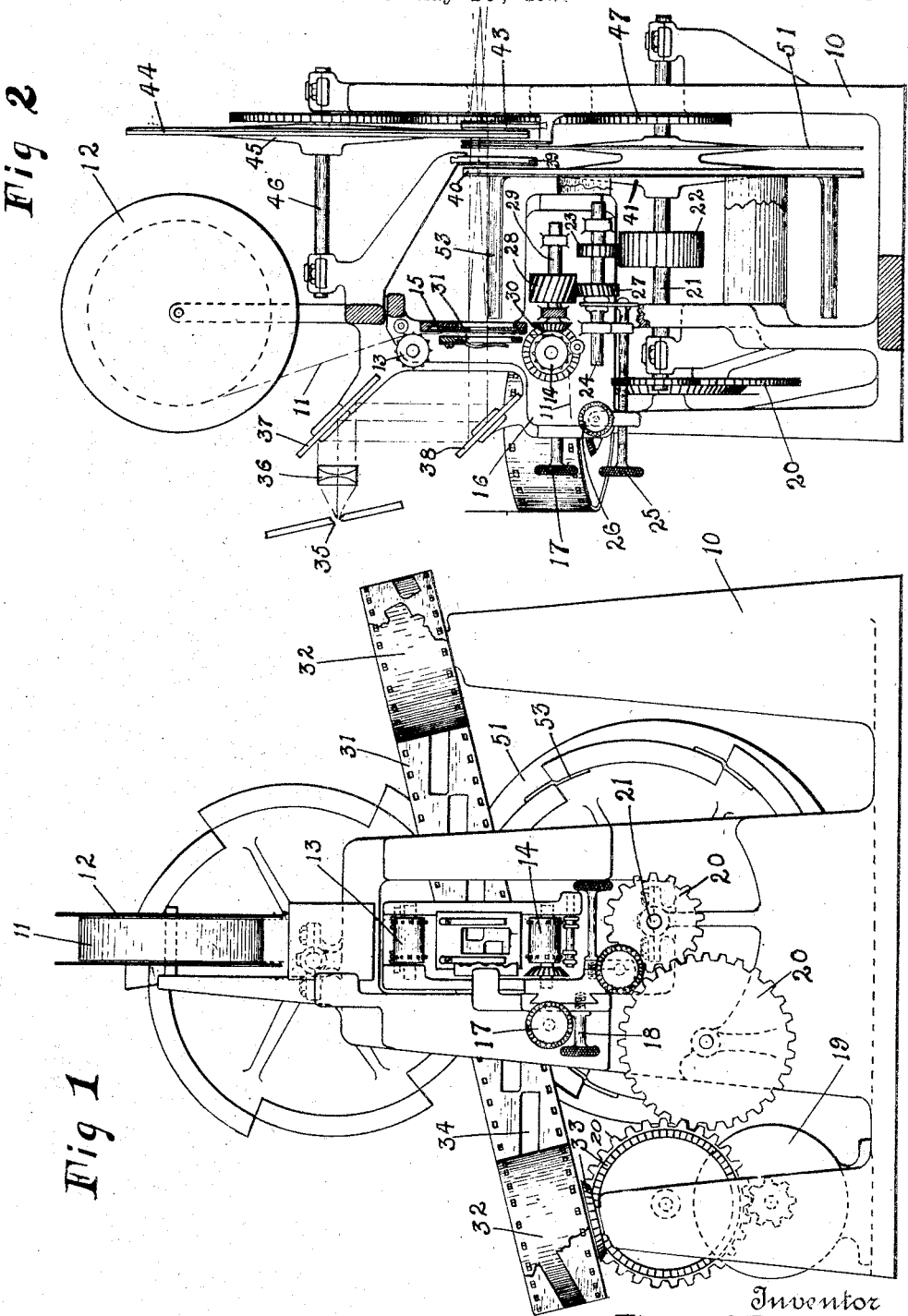
Inventor  
Elwood C. Rogers,  
By  
Hood & Schley  
Attorneys June 9, 1925.　　　　　E. C. ROGERS　　　　　1,540,902
MOVING PICTURE MACHINE
Filed May 14, 1920　　　3 Sheets-Sheet 2

Inventor
Elwood C. Rogers,
By Hood & Schley
Attorneys

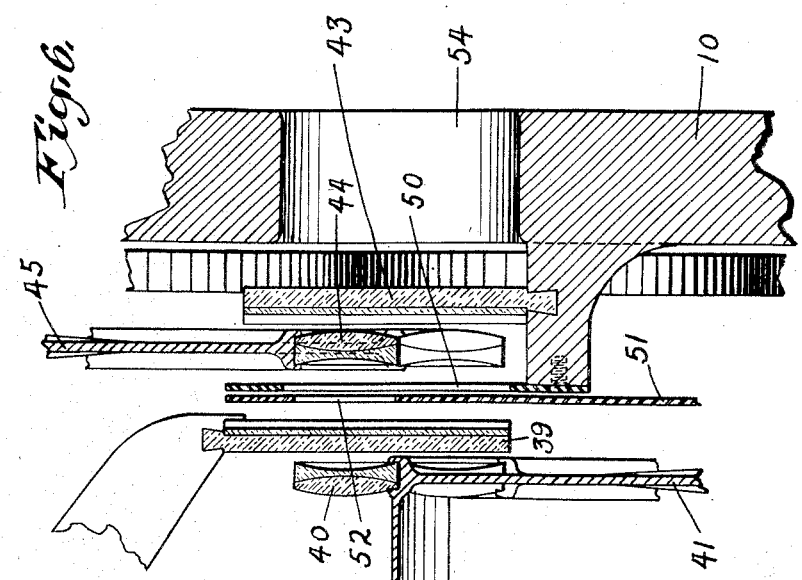
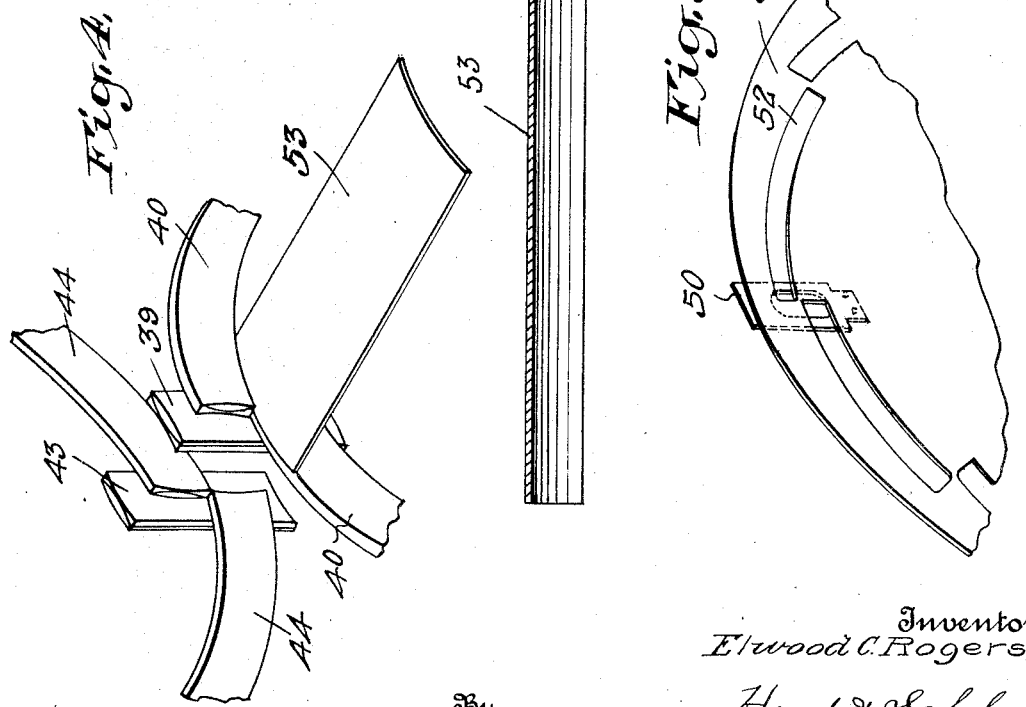

Patented June 9, 1925.

1,540,902

UNITED STATES PATENT OFFICE.

ELWOOD C. ROGERS, OF INDIANAPOLIS, INDIANA.

MOVING-PICTURE MACHINE.

Application filed May 14, 1920. Serial No. 381,333.

*To all whom it may concern:*

Be it known that I, ELWOOD C. ROGERS, a citizen of the United States, residing at Indianapolis, in the county of Marion and State of Indiana, have invented a new and useful Moving-Picture Machine, of which the following is a specification.

It is the object of my invention to make a moving picture machine which maintains the light constantly on the screen and maintains the film in uniform motion, instead of cutting off the light during intermittent movements of a film which remains stationary during the time the light is on.

In carrying out my invention, I give the film a continuous uniform motion, and provide a shutter, preferably in the form of a band, which moves continuously obliquely across the path of the film at such a rate that that component of its motion in line with the film movement is at the same rate as the film movement; and I conduct the light which passes through the film through sets of cylinder lenses, instead of through the usual spherical lenses, each set of cylinder lenses comprising a stationary cylinder lens with its axis substantially in the direction of film movement and a series of movable cylinder lenses preferably arranged with curved axes as portions of spirals on a rotating member but in any case moving as they pass the stationary lens so that a component of lens movement along the axis of such stationary lens is produced nearly equal to the film movement but sufficiently slower to keep the picture in fixed position on the screen. The rotating members of the sets of cylinder lenses preferably have their centers of rotation on opposite sides of the path of light through the cylinder lenses, to compensate for whatever distortion may be caused by the spirally arranged cylinder lenses.

The accompanying drawings illustrate my invention: Fig. 1 is a rear view of a moving picture projection machine embodying my invention, some parts being broken away; Fig. 2 is a side elevation of such machine, with some parts in section or broken away in order better to show the construction; Fig. 3 is a front elevation of such machine; Fig. 4 is a fragmentary perspective view of the various cylinder lenses at and near the line of the path of light; Fig. 5 is a similar perspective view of the rotating and stationary members of the diaphragm at and near the same line; and Fig. 6 is an enlarged fragmentary vertical section, substantially on the line 6—6 of Fig. 3, through the stationary and movable cylinder lenses at the line of the path of light.

The various parts are carried by a main frame 10, which has the necessary arms and bearings for that purpose. The film 11 is fed from an upper spool 12 over two sprockets 13 and 14 to a suitable rewind roller (not shown), and travels in a straight line between such two sprockets through a film gate 15, the lower sprocket 14 being the film-driving sprocket. The film gate 15 and the two sprockets 13 and 14 are carried by a horizontally slidable sub-frame 16, which for focusing purposes is preferably adjustable forward and back along the line of the path of light by a thumb-screw 17, a clamping screw 18 being provided for locking it in adjusted position.

The film-driving sprocket 14 and the other moving parts are all operated synchronously, conveniently by a power motor 19, though power operation is not essential. The motor or other source of power 19 is connected through suitable gearing 20 to a horizontal shaft 21, which carries a wide spur gear 22 meshing with a narrow spur gear 23 on a shaft 24 carried by and longitudinally shiftable relatively to the sub-frame 16, by a thumb-screw 25 suitably connected with such shaft 24 for shifting it, a clamping screw 26 being provided for clamping the thumb-screw 25 in any adjusted position. A narrow spiral gear 27 fixed on the shaft 24 meshes with a wide spiral gear 28 carried by a shaft 29 parallel to the shaft 24 and mounted in suitable bearings in the sub-frame 16. The shaft 29 is connected to the film-driving roller 14 through bevel gearing 30. By manipulating the thumb-screw 25 to shift the shaft 24 longitudinally, the shaft 29 is advanced or retarded by reason of the spiral gearing 27—28, thus making it possible to produce proper framing of the picture in the film gate 15. By manipulating the thumbscrew 17, the picture is focused without interfering with the framing, by reason of the relative longitudinal shifting without advancing or retarding permitted by the spur gearing 22—23.

The film gate 15, through which the film moves vertically, also serves as a guide for a band shutter 31, which moves obliquely across such film gate. The film gate has an opening through it in the line of the path of light equal in width to the width of the picture and having a height something more than twice the height of one picture. The shutter band 31 is carried by two large toothed drums 32, one of which is driven by bevel gearing 33 branching off from the gearing 20. The shutter band 31 is provided with a series of rectangular openings 34, which are set obliquely in the band so that their sides are vertical and horizontal respectively as they pass the film gate 15, as is clear from Figs. 1 and 3. The height of each opening 34 is equal to that of one picture of the film, and the rate of movement of the shutter band across the film is such that the vertical component of shutter movement is equal to the rate of film movement, so that the opening 34 travels downward with the co-operating film picture as the film and shutter move through their respective guides. The horizontal length of each opening 34 depends on the slope of the shutter, but is sufficient to leave a picture uncovered as the film and shutter move during the time it takes for the film to move downward the height of one picture. The adjacent horizontal ends of adjacent openings 34 are shown in vertical alinement with each other, as is clear from Figs. 1 and 3, so that one opening 34 comes into registry with its associated film picture and the opening in the film gate 15 as the preceding one passes out of registry with its film picture and such opening; but exact alinement is not necessary.

The light for the film, from any suitable source of light such as an arc light 35, passes through a suitable condensing lens 36, and is directed by two mirrors 37 and 38 to the opening in the film gate 15. Thus the light 35 may be offset from the line of light through the film, permitting access to the rear of the film gate without interference of the light source and also avoiding interference between the location of the source of light and the rear stretch of the shutter band 31.

In front of the film gate are two sets of cylinder lenses. Each set comprises a cylinder lens with a vertical axis extending across the path of the line of light, and (in the preferred arrangement shown) a circular series of segments of spirally arranged curved axis cylinder lenses carried by a rotating member. The two cylinder lenses of each set where they co-operate in the path of light have the effect of a single spherical lens, one cylinder lens furnishing the curvature in the vertical direction and the other that in the horizontal direction, with the optical axis horizontal along the path of light and vertically shiftable by the eccentricity of the moving spirally arranged cylinder lenses.

The rear set of cylinder lenses comprises the stationary vertical-axis cylinder lens 39, preferably of at least twice the height of a picture and of suitable width, and the circular series of spirally arranged cylinder lenses 40 carried by a disk 41 fixed on the shaft 21. Each of the lenses 39 and 40 is a compound lens, for suitable optical correction. The cylinder axis of each lens 40 is in the form of a spiral with respect to the axis of the shaft 21, which is directly below the lens 39, and its opposite ends are offset radially from one another by nearly the height of one picture, assuming there is no overlapping. The disk 41 is driven at the proper speed so that successive lenses 40 co-operate with successive pictures of the film and so that the radial component of lens movement of the lens 40 as it passes the lens 39 is nearly equal to the speed of the film movement and in the same direction; it is not quite equal to the film speed in order that no movement of the picture on the screen may occur as the film moves. The light rays from any particular picture in the film pass through such lens 40 continuously as the picture is moved and is opposite one of the openings 34 of the shutter band.

The front set of lenses is substantially like the rear set, comprising a cylinder lens 43 with its cylinder axis vertical and a circular series of spirally arranged cylinder lenses 44 carried by a disk 45 fixed on a shaft 46 connected to the shaft 21 through suitable gearing 47, which drives the disk 45 at proper speed so that the radial component of lens movement of each lens 44 as it passes the stationary lens 43 is nearly equal to the speed of film movement and in the same direction. The lenses 43 and 44 are also compound lenses, for optical correction. The axis of the disk 45 is above the lens 43 and in line therewith, so that the shafts 21 and 46 are respectively on opposite sides of the path of light, one below and one above, and the movements of the disks 41 and 45 are preferably in opposite directions, so that any light distortion which may be due to the spiral cylinders will be compensated for in the cylinders on the two disks.

Perhaps the term "spirally arranged cylinders" is not strictly accurate in describing the lenses 40 and 44; but it is thought it described such lenses in the way most easily understood. Each of these lenses is fundamentally a cylinder the axis of which is curved in the form of a segment of a spiral instead of being a straight line.

Between the two sets of cylinder lenses is a shutter diaphragm with a shifting opening, formed by a stationary opaque plate 50, with an opening through it of greater height than width, and a rotating opaque plate 51 carried by one of the shafts 21 and 46, as shown by the shaft 21, and provided with a series of spirally arranged openings 52 which register with the respective cylinder lenses, here the cylinder lenses 40, carried by the same shaft. Adjacent ends of adjacent cylinder lenses in each series and adjacent ends of adjacent openings 52 in the rotating plates 51 are preferably in radial alinement, so that as one lens or opening passes into registry with the stationary lenses the preceding ones pass out of registry therewith. This keeps the light constantly on the screen, without interference.

In order further to avoid the possibility of interference, the disk 41 is provided with a series of rearwardly extending fingers 53 substantially arc-shaped in cross-section and located on the radii at which adjacent cylinder lenses 40 meet but along which radii such adjacent ends are offset by nearly the height of a film picture. These fingers 53 prevent interference between the light from two pictures as one is passing off and the other is coming on.

In operation, the film 11 is fed with a continuous uniform movement downward past the openings in the film gate 15. The shutter band 31 is also driven with a uniform motion, and as it passes through its guide at the film gate the successive openings 34 in the shutter band register with successive pictures and move downward with such pictures and at the same speed. The light from the source 35, as transmitted through the condensing lens 36 and reflected by the mirrors 37 and 38, passes through the downwardly moving film picture and opening 34, and on to the rearmost series of cylinder lenses. There it passes through the moving lens 40 then in position, which lens produces vertical deflection of the various light rays, and through the lens 39, which produces the corresponding horizontal deflection of such light rays. By the rotation of the disk 41, the working part of the lens 40 moves downward with the passing light rays at nearly the same speed as the film itself moves, the difference merely avoiding movement of any picture on the screen. After passing through the rear set of cylinder lenses, the light passes through the proper opening 52 in the rotating plate 51 and the opening in the stationary plate 50, the working part of the opening 52 moving downward or inward at about the same speed as the working part of the lens 40. Then the light rays pass through the forward set of cylinder lenses, first through the moving lens 44 then in position, to produce the proper vertical deflection, and then through the stationary lens 43, to produce the corresponding horizontal deflection. Then the light passes through the frame opening 54, and on to the screen.

As each picture of the film comes opposite the upper part of the opening in the film gate 15, one of the openings 34 in the shutter band begins to move horizontally across such picture, and one each of the circular lenses 40 and 44 catches the light so transmitted and allows it to pass on to the screen, such opening 23 and both of such lenses 40 and 44 having a downward movement to correspond with that of the film; and as one picture passes out of registry with the opening in the film gate and with its respective openings 34 and 52 and lenses 40 and 44 another picture passes into registry with the succeeding openings and lenses respectively. Thus the light is continuously kept on the screen, and the film is operated with a continuous uniform movement.

I claim as my invention:

1. In a moving picture machine, the combination of means for moving a film in one direction, and a shutter moving obliquely to the direction of film movement and provided with openings which cross the film with a component of movement in the line of film movement corresponding to the speed of film movement, the sides of said opening being adapted to frame the film on two opposite sides.

2. In a moving picture machine, the combination of means for moving a film in one direction, and a shutter moving across the film and provided with straight-edged openings which frame the film on two opposite sides and which obliquely cross the film with a component of movement in the line of film movement corresponding to the speed of film movement.

3. In a moving picture machine, the combination of means for continuously moving a film, and a set of cylinder lenses comprising a stationary cylinder lens having its cylinder axis parallel to the line of film movement and a movable cylinder lens having its cylinder axis transverse to that of the first cylinder lens, said second cylinder lens having a lens movement along the axis of the first cylinder lens substantially corresponding to the motion of the film.

4. In a moving picture machine, the combination of means for continuously moving a film, and a set of cylinder lenses comprising a stationary cylinder lens having its cylinder axis parallel to the line of film movement and a movable cylinder lens having its cylinder axis transverse to that of the first cylinder lens, said second cylinder lens being arranged to move across the line of film movement with a component of lens movement along the axis of the first cylinder lens substantially corresponding to the motion of the film.

5. In a moving picture machine, the combination of means for continuously moving a film, and two sets of cylinder lenses each comprising a stationary cylinder lens having its cylinder axis parallel to the line of film movement and a movable cylinder lens having its cylinder axis transverse to that of the first cylinder lens, said second cylinder lens of each set having a lens movement along the axis of the first cylinder lens of that set substantially corresponding to the motion of the film.

6. In a moving picture machine, the combination of means for continuously moving a film, and two sets of cylinder lenses each comprising a stationary cylinder lens having its cylinder axis parallel to the line of film movement and a movable cylinder lens having its cylinder axis transverse to that of the first cylinder lens, said second cylinder lens of each set being arranged to move across the line of film movement with a component of lens movement along the axis of the first cylinder lens of that set substantially corresponding to the motion of the film.

7. In a moving picture machine, the combination of means for continuously moving a film, a set of cylinder lenses comprising a stationary cylinder lens having its cylinder axis parallel to the line of film movement and a movable cylinder lens having its cylinder axis transverse to that of the first cylinder lens, said second cylinder lens having a lens movement along the axis of the first cylinder lens substantially corresponding to the motion of the film, and a shutter movable across the film and having openings which have a component of movement in the line of film movement corresponding to the film movement.

8. In a moving picture machine, the combination of means for continuously moving a film, two sets of cylinder lenses each comprising a stationary cylinder lens having its cylinder axis parallel to the line of film movement and a movable cylinder lens having its cylinder axis transverse to that of the first cylinder lens, said second cylinder lens of each set having a lens movement along the axis of the first cylinder lens of that set substantially corresponding to the motion of the film, and a shutter movable across the film and having openings which have a component of movement in the line of film movement corresponding to the film movement.

9. In a moving picture machine, the combination of means for moving a film continuously across a light-transmitting opening, a cylinder lens in the line of the path of light through such opening with its axis parallel to the film movement, and a rotating member carrying a second cylinder lens crossing the first and having its axis curved in a spiral transverse to that of the first where they cross, said rotating member being arranged to rotate at the proper speed to produce a component of lens movement of said second lens along the cylinder axis of the first corresponding to the movement of the film.

10. In a moving picture machine, the combination of means for moving a film continuously across a light-transmitting opening, two cylinder lenses in the line of the path of the light through such openings with their axes parallel to the film movement, and a rotating member associated with each of said cylinder lenses and each carrying a cylinder lens crossing the first lenses and having its axis curved in a spiral transverse to the axes of the first lenses at the crossing place, said rotating members being arranged to rotate at the proper speed to produce a component of lens movement of the cylinder lens carried thereby along the axes of the first lenses corresponding to the movement of the film.

11. In a moving picture machine, the combination of means for moving a film continuously across a light-transmitting opening, a cylinder lens in the line of the path of light through such opening with its axis parallel to the film movement, a rotating member carrying a second cylinder lens crossing the first and having its axis curved in a spiral transverse to that of the first where they cross, said rotating member being arranged to rotate at the proper speed to produce a component of lens movement of said second lens along the cylinder axis of the first corresponding to the movement of the film, and a shutter movable across the film and having openings which have a component of movement in the line of film movement corresponding to the film movement.

12. In a moving picture machine, the combination of means for moving a film continuously across the light-transmitting opening, two cylinder lenses in the line of the path of the light through such opening with their axes parallel to the film movement, a rotating member associated with each of said cylinder lenses and each carrying a cylinder lens crossing the first lenses and having its axis curved in a spiral transverse to the axes of the first lenses at the crossing place, said rotating members being arranged to rotate at the proper speed to produce a component of lens movement of the cylinder lens carried thereby along the axes of the first lenses corresponding to the movement of the film, and a shutter movable across the film and having openings which have a component of movement in the line of film movement corresponding to the film movement.

13. In a moving picture machine, the combination of means for moving a film continuously across a light-transmitting opening, a cylinder lens with its axis parallel to the direction of such film movement, and a rotating member associated with said cylinder lens, said rotating member being provided with a circular series of cylinder lenses each of which has its axis curved in the form of a segment of a spiral, said rotating member being arranged to rotate to bring its cylinder lenses successively into line with the path of light passing through the first cylinder lens.

14. In a moving picture machine, the combination of means for moving a film continuously across a light-transmitting opening, two cylinder lenses with their axes parallel to the direction of such film movement and a rotating member associated with each of said cylinder lenses, each of said rotating members provided with a circular series of cylinder lenses each of which has its axis curved in the form of a segment of a spiral, each of said rotating members being arranged to rotate to bring its cylinder lenses successively into line with the path of light passing through the first cylinder lenses.

15. In a moving picture machine, the combination of means for moving a film past a light-transmitting opening, a source of light, a collecting lens through which such light is transmitted, said collecting lens being offset out of line with such opening, and a pair of fixed mirrors for reflecting the light from said collecting lens through said light-transmitting opening.

16. In a moving picture machine, the combination of means for moving a film across a light-transmitting opening, a shutter band provided with openings and associated with said light-transmitting opening, a source of light offset from the line of such opening so that it does not interfere with that stretch of the shutter band which is not co-operating with such light-transmitting opening, and mirrors for reflecting the light from said source into the line of such light-transmitting opening.

17. In a moving picture machine, the combination of means for moving a film continuously past a light-transmitting opening, a cylinder lens having its axis in line with such opening and substantially parallel to the direction of film movement, and a plurality of cylinder lenses arranged to co-operate respectively with successive pictures of the film and with the first cylinder lens with their axes transverse to that of the first cylinder lens.

18. In a moving picture machine, the combination of means for continuously moving a film, and a set of cylinder lenses comprising a stationary cylinder lens and a movable cylinder lens having their cylinder axes transverse to each other, said second cylinder lens having a lens movement along the axis of the first cylinder lens substantially corresponding to the motion of the film.

19. In a moving picture machine, the combination of means for continuously moving a film, and two sets of cylinder lenses each comprising a stationary cylinder lens and a movable cylinder lens having their cylinder axes transverse to each other, said second cylinder lens of each set having a lens movement along the axis of the first cylinder lens of that set substantially corresponding to the motion of the film.

20. In a moving picture machine, the combination with film-moving means, of a lens consisting of two cylinder lenses with their cylinder axes transverse to each other, one of said cylinder lenses being movable to co-operate with different axial parts of the other.

21. In a moving picture machine, the combination of film-moving means, a film gate across which the film is moved, and a shutter band having light-transmitting openings therein and movable rectilinearly across the opening in the film gate, said film gate being provided with guideways for said shutter band.

22. In a moving picture machine, the combination of film-moving means, and means for outlining a picture comprising a member having an opening of substantially the width of the picture and of at least twice the height of the picture to form the picture sides and a movable member having openings of the height of the picture and of more than the width of the picture and forming the top and bottom edges of the picture.

23. In a moving picture machine, the combination of film-moving means, a cylinder lens, a plurality of cylinder lenses transverse to the first cylinder lens and movable relatively thereto, adjacent ends of adjacent lenses of said plurality of lenses being offset from one another along the axis of the first lens, and fingers located at adjacent ends of adjacent lenses of the said plurality of lenses and projecting out of the plane of such members.

24. In a moving picture machine, the combination of a film gate across which a film is moved, and a movable member carrying a plurality of lenses spaced from said film gate and moving in correspondence with the film movement, and fingers projecting between adjacent lenses toward the film gate to prevent interference of light through the different lenses.

In witness whereof, I have hereunto set my hand at Indianapolis, Indiana, this 12th day of May, A. D. one thousand nine hundred and twenty.

ELWOOD C. ROGERS.